United States Patent
Li et al.

(10) Patent No.: US 12,060,524 B2
(45) Date of Patent: Aug. 13, 2024

(54) DIVERTING MATERIALS FOR WELL STIMULATION

(71) Applicant: Saudi Arabian Oil Company, Dhahran (SA)

(72) Inventors: Wenwen Li, Pearland, TX (US); Fakuen Frank Chang, Houston, TX (US); Nam Mai, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 10 days.

(21) Appl. No.: 17/848,143

(22) Filed: Jun. 23, 2022

(65) Prior Publication Data
US 2023/0416600 A1 Dec. 28, 2023

(51) Int. Cl.
*E21B 43/34* (2006.01)
*C09K 8/88* (2006.01)
*C09K 8/92* (2006.01)

(52) U.S. Cl.
CPC .............. *C09K 8/885* (2013.01); *C09K 8/92* (2013.01)

(58) Field of Classification Search
CPC ............ C09K 8/885; C09K 8/92; E21B 43/34
USPC ......................................................... 166/307
See application file for complete search history.

(56) References Cited

U.S. PATENT DOCUMENTS

| | | | |
|---|---|---|---|
| 4,951,751 A | 8/1990 | Jennings, Jr. | |
| 7,506,689 B2 | 3/2009 | Surjaatmadja et al. | |
| 7,569,523 B2 | 8/2009 | Cooke, Jr. | |
| 8,318,820 B2 | 11/2012 | Guelcher et al. | |
| 8,905,133 B2 | 12/2014 | Potapenko et al. | |
| 9,309,454 B2 | 4/2016 | Smith et al. | |
| 9,447,249 B2 | 9/2016 | Spies et al. | |
| 9,580,642 B2* | 2/2017 | Brannon ............... | E21B 43/267 |
| 9,862,881 B2 | 1/2018 | Drake et al. | |
| 9,938,811 B2* | 4/2018 | Bestaoui-Spurr ...... | C09K 8/665 |
| 10,030,494 B2 | 7/2018 | Walters et al. | |
| 2014/0116704 A1* | 5/2014 | Reddy ...................... | C09K 8/68 166/300 |
| 2015/0159465 A1 | 6/2015 | Lecerf et al. | |
| 2018/0346786 A1* | 12/2018 | Zielinski ................ | C08G 18/73 |
| 2019/0161670 A1* | 5/2019 | Dreyer .................. | E21B 33/138 |

(Continued)

FOREIGN PATENT DOCUMENTS

| | | |
|---|---|---|
| WO | 2011154712 | 12/2011 |
| WO | 2016100647 | 6/2016 |
| WO | 2016186675 | 11/2016 |

OTHER PUBLICATIONS

Dreyer et al., "High Performance Fracturing Fluid Diverters with Broad Spectrum Applicability," SPE/AAPG/SEG Unconventional Resources Technology Conference, Jul. 2019, 14 pages.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

Compositions containing a diverting material, and related methods and systems for diverting a fluid from a high permeability zone in an underground formation to a low permeability zone in the underground formation. The diverter material contains a polyurethane and a second polymer. The compositions, methods and systems may be used to achieve more homogeneous stimulation during a well stimulation treatment.

19 Claims, 9 Drawing Sheets

(56) References Cited

U.S. PATENT DOCUMENTS

2022/0025251 A1   1/2022   Chang et al.

OTHER PUBLICATIONS

Gomaa et al., "Engineering Solid Particulate Diverter to Control Fracture Complexity: Experimental Study," SPE Hydraulic Fracturing Technology Conference, Feb. 2016, 19 pages.
Wei, "Evaluation of preformed particle gel as a diverting agent for acidizing," Thesis for the degree of Master of Science in Petroleum Engineering, Missouri University of Science and Technology, 2017, 78 pages.
Zhang et al., "A novel targeted plugging and fracture-adaptable gel used as a diverting agent in fracturing," Energy Science & Engineering 8.1, Jan. 2020, 116-133, 18 pages.

* cited by examiner

DIVERTING MATERIALS FOR WELL STIMULATION

FIELD

The disclosure relates to compositions containing a diverting material, and related methods and systems for diverting a fluid from a high permeability zone in an underground formation to a low permeability zone in the underground formation. The compositions, methods and systems of the disclosure may be used to achieve more homogenous stimulation during a well stimulation treatment.

BACKGROUND

A well stimulation treatment (e.g., a hydraulic fracturing or matrix treatment) may be performed in an underground formation to enhance the production of a desired hydrocarbon, such as crude oil or natural gas. In hydraulic fracturing, a fracturing fluid is injected into the underground formation at a high pressure to create fractures in the underground formation. In matrix stimulation, an acid is injected into the underground formation to dissolve underground carbonate formations, creating macroscopic channels (wormholes) in the underground formation. The desired hydrocarbon can flow through the fractures or macroscopic channels. In some cases, the underground formation may be long and have a heterogeneous structure making it difficult to evenly distribute the fracturing fluid or the acid.

SUMMARY

The disclosure relates to compositions containing a diverting material, and related methods and systems for diverting a fluid from a high permeability zone in an underground formation to a low permeability zone in the underground formation. The diverter materials can assist in the distribution of a fluid (e.g., a fracturing fluid, an acid) in the underground formation, leading to a more even distribution of fractures or macroscopic channels formed by the fluid in the formation. Thus, the diverter materials can increase the production and/or recovery rate of a hydrocarbon-producing well used to extract the hydrocarbon from the underground formation. The diverter materials can reduce the costs and/or complexity of extracting a desired hydrocarbon from the underground formation because, for example, a single diverter material may be used for multiple jobs with relatively good efficiency and/or additional equipment may not be needed. The diverter materials can be used in hydraulic fracturing of reservoirs or unconventional subsurfaces of oil and gas bearing rocks (e.g. shale).

Generally, the diverter materials contain an elastic material and a soft polymer. The diverter materials can be used to block a wide range of opening sizes and openings with dynamically changing sizes. The diverter materials can be disposed in the underground formation to block at least a portion of a high permeability zone of the underground formation. The diverter materials can be reversibly compressible. Thus, the size and shape of the diverter materials is variable. In some embodiments, the diverter materials can undergo compression to plug and block the high permeability zone. In some embodiments, the diverter materials can continue to block a high permeability zone as the size of fractures and/or other openings in the high permeability zone increase during the stimulation process. Without wishing to be bound by theory, it is believed that the soft polymer can fill gaps between the elastic portions (e.g. polyurethane) to maintain relatively low permeability and relatively high sealing efficiency. Generally, the diverter materials can seal fractures and/or other openings of different sizes and shapes in a high permeability zone, thereby maintaining good sealing during the entire stimulation process. In addition, the diverter materials can be relatively easily removed (e.g., degraded) after the stimulation process to reduce (e.g., prevent) damage to the underground formation.

In a first aspect, the disclosure provides a method, including using a diverter material to block at least a portion of a high permeability zone in an underground formation, wherein the diverter material includes a polyurethane and a second polymer.

In some embodiments, the polyurethane has an elasticity of at least 100 psi and at most 1,000 psi as measured by single particle compression or packed multi-particle compression tests.

In some embodiments, the second polymer has a viscosity of at least 1,000 centipoise and at most 10,000 centipoise.

In some embodiments, the diverter material is disposed in the high permeability zone of the underground formation.

In some embodiments, disposing the diverter material in the high permeability zone of the underground formation compresses the diverter material.

In some embodiments, the diverter material is reversibly compressible.

In some embodiments, disposing the diverter material in the high permeability zone of the underground formation reduces a volume of the diverter material from 10% to 90%.

In some embodiments, the second polymer fills gaps between the polyurethane.

In some embodiments, the diverter material includes particles including a core and a shell, the core including the polyurethane, and the shell including the second polymer; particles including the polyurethane and the second polymer, the polyurethane being distributed within the second polymer; and a blend including the polyurethane and the second polymer.

In some embodiments, the diverter material may be degraded by hydrolysis, transesterification, oxidation, interaction with an enzyme, pressure modification, and/or pH modification.

In some embodiments, the second polymer includes an acrylate, an acrylamide, a N,N-dimethylacrylamide, a (meth)acrylamide, a N-alkyl(meth)acrylamide (where alkyl is $C_1$-$C_3$), a dimethyl(meth)acrylamide, a 4-acryloylmorpholine, a N-vinylpyrrolidone, a N-vinylformamide, a N-vinylacetamide, and/or an acrylic acid.

In some embodiments, the second polymer includes a polysaccharide, a derivative of a polysaccharide, a guar, a cellulose, a hyaluronic acid, a gelatin alginate, a poly(ethylene glycol), a poly(propylene glycol), a poly(lactic acid), a poly(glycolic acid), a poly(caprolactone), a poly(acrylic acid), a polyvinyl alcohol, a polyacrylate, a polyamide, a polyvinylpyrrolidone, and/or a silane modified polyether.

In some embodiments, the diverter material has a weight ratio of the polyurethane to the second polymer of from 1:9 to 99:1.

In some embodiments, the high permeability zone includes a member selected from the group consisting of a fracture of the underground formation, a macroscopic channel of the underground formation, and a high permeability layer of the underground formation; the diverter material is in the member; and the diverter material at least partially blocks the member.

In some embodiments, the diverter material is in the form of an agglomerated particulate pack.

In some embodiments, a volume of the member increases, and, after the volume of the member increases, the diverter material still at least partially blocks the member.

In some embodiments, diverter material is used to divert a flow of a liquid within the underground formation, wherein the liquid includes a fracturing fluid and/or an acid.

In some embodiments, the underground formation further includes a low permeability zone; the method includes disposing the diverter material in the high permeability zone; and the diverter material increases an amount of a fracturing fluid or an acid in the low permeability zone compared to when the diverter material is not present in the high permeability zone.

In some embodiments, the high permeability zone includes a member selected from the group consisting of a fracture of the underground formation, a macroscopic channel of the underground formation, and a high permeability layer of the underground formation; the diverter material is in the member; and the diverter material at least partially blocks the member.

In a second aspect, the disclosure provides a system, including a diverter material and a fluid; wherein the diverter material is disposed in a high permeability zone of an underground formation so that the diverter material blocks at least a portion of the high permeability zone; and the diverter material includes a polyurethane and a second polymer.

DETAILED DESCRIPTION

Figure 1A:
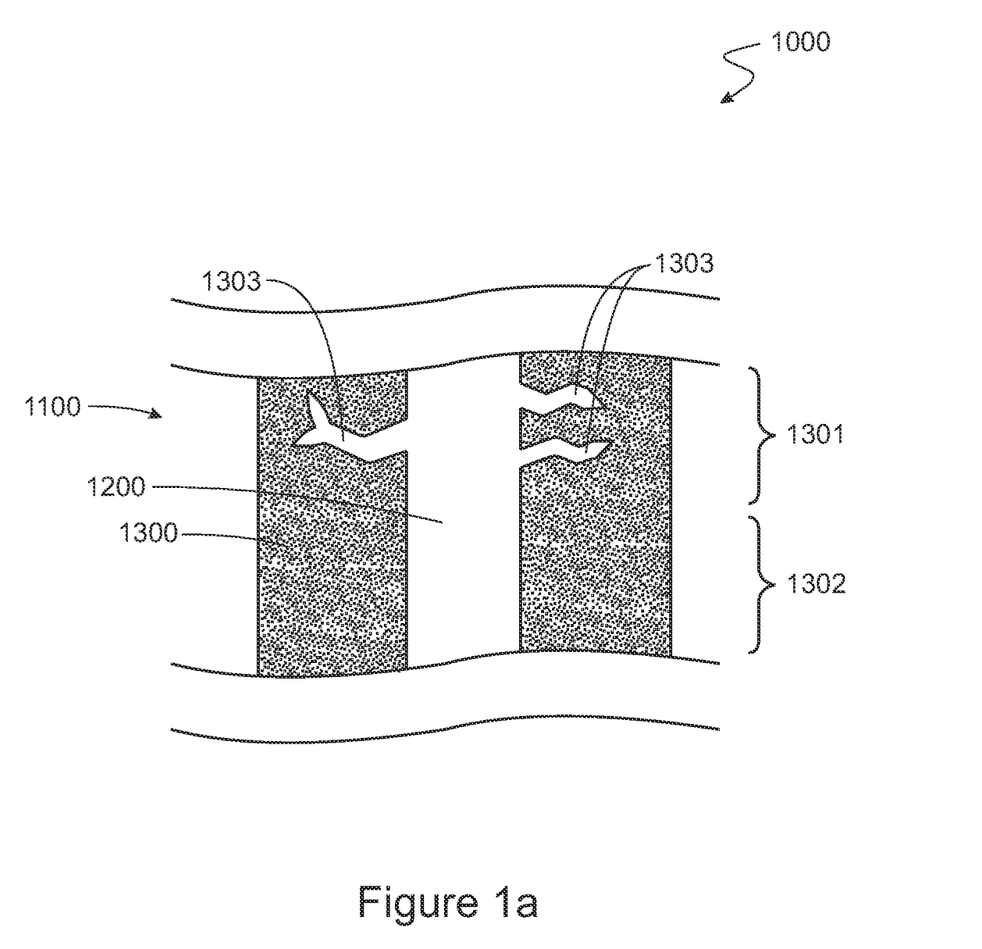
FIG. 1a schematically depicts a system that includes an underground formation with a wellbore, and a hydrocarbon-producing zone with a high permeability zone and a low permeability zone.

FIG. 1a schematically depicts a system 1000 with an underground formation 1100 that contains a wellbore 1200 and a hydrocarbon-producing zone 1300, which produces a hydrocarbon of interest, such as crude oil and/or natural gas. The hydrocarbon-producing zone 1300 includes a high permeability zone 1301 and a low permeability zone 1302. In general, the high permeability zone 1301 provides relatively good permeability for the hydrocarbon of interest, while the low permeability zone 1302 provides relatively poor permeability for the hydrocarbon of interest. Generally, the relatively high permeability is due to the presence of relatively large openings 1303 in the high permeability zone. An opening 1303 can be, for example, a fracture, a macroscopic channel or a high permeability layer. In some embodiments, an opening 1303 is natural (e.g., a natural fracture). In some embodiments, an opening 1303 is man-made (e.g., a man-made fracture). The openings 1303 allow the hydrocarbon to flow from the high permeability zone 1301 to the wellbore 1200 and be recovered.

Figure 1B:
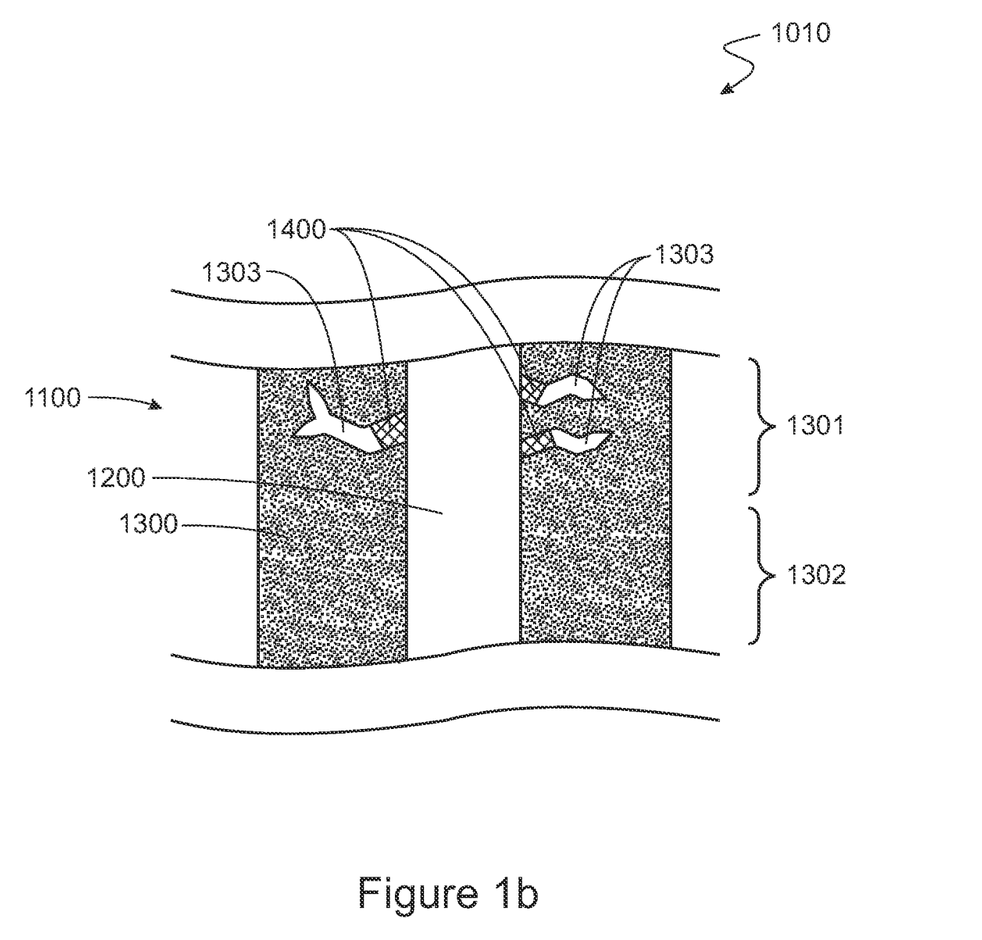
FIG. 1b schematically depicts a system that includes an underground formation with a wellbore, a hydrocarbon-producing zone, with a high permeability zone and a low permeability zone, and a diverter material.

FIG. 1b schematically depicts a system 1010, which corresponds to the system 1000 of FIG. 1a, after a diverter material 1400 is disposed in the well bore 1200 such that the diverter material 1400 blocks at least a portion of each of the openings 1303 in the high permeability zone 1301. In some embodiments, the diverter material 1400 is disposed in the well bore 1200 by injection into the wellbore 1200.

Figure 1C:
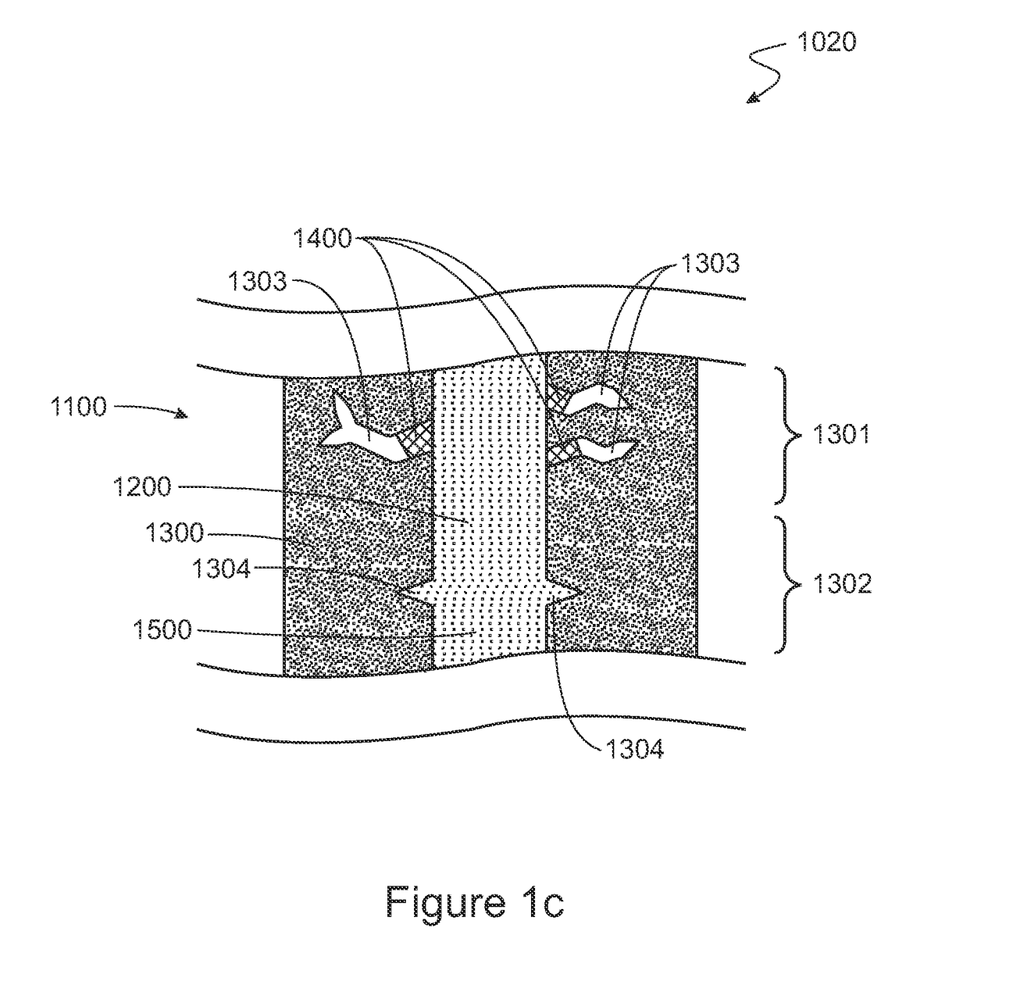
FIG. 1c schematically depicts a system that includes an underground formation with a wellbore, a hydrocarbon producing zone with a high permeability zone and a low permeability zone, a diverter material and a fluid.

FIG. 1c schematically depicts a system 1020, which corresponds to the system 1010 of FIG. 1b, after a fluid 1500 is disposed in the well bore 1200. In some embodiments, the fluid 1500 is disposed in the well bore 1200 by injection into the wellbore 1200. Due to the presence of the diverter material 1400, little if any of the fluid 1500 enters the openings 1303 in the high permeability zone 1301. However, the fluid 1500 is able to interact with the material in the low permeability zone 1302 to form openings 1304 in the low permeability zone 1302. The openings 1304 are larger than the other openings in the low permeability zone 1302. As a result, by creating the openings 1304, the fluid 1500 serves to increase the permeability of the low permeability zone 1302 and increase hydrocarbon recovery from the low permeability zone 1302. An opening 1304 can be, for example, a fracture or a macroscopic channel. In some embodiments, the fluid 1500 is a fracturing fluid (e.g., water based polymeric solutions such as solutions of guar, cellulose, viscosified oil, viscoelastic surfactant and/or cross-linked polymer gels) that cracks the low permeability zone 1302 to create openings 1304 in the form of fractures. In some embodiments, the fluid 1500 is an acid (e.g. hydrochloric acid, an acidic chelating agent such as ethylenediaminetetraacetic acid, tetrasodium glutamate diacetate, hydroxyethylethylenediaminetriacetic acid, diethylenetriaminepentaacetic acid) that dissolves material (e.g., carbonate formations) in the low permeability zone 1302 to create openings 1304 in the form of new macroscopic channels.

While FIG. 1b shows the diverter material 1400 disposed into the openings 1303 prior to disposing the fluid 1500, in some embodiments, the diverter material 1400 may be carried into the high permeability zone 1301 and/or openings 1303 in the high permeability zone 1301 by the fluid 1500 (e.g. a fracturing fluid, an acid). Additional fluid 1500 may then be disposed into the wellbore 1200 to create new openings 1304 in the low permeability zone 1302.

In addition to being used to selectively enhance the relative permeability of the low permeability zone 1302, the diverter material 1400 is reversibly compressible so that the diverter material can withstand contractions and expansions of the openings 1303 while still at least partially blocking the openings 1303. Generally, the reversible compressibility is achieved by forming the diverter material 1400 of an elastic material and a soft polymer. Without wishing to be bound by theory, it is believed that when the width of the openings 1303 increases, the elastic portion of the diverter material 1400 expands due to internal elastic energy, and the diverter material closely adheres to the walls of the openings 1303. Additionally, without wishing to be bound by theory, it is believed that the soft polymer fills gaps between elastic particles of the diverter material 1400 and enhances the overall sealing efficiency of the diverter material 1400.

Moreover, the diverter material 1400 can be selectively degradable such that the diverter material 1400 can be relatively easily removed from the openings 1303 when desired, such as after formation of the openings 1304, thereby reducing (e.g., preventing) damage to the underground formation 1300 due to the presence of the diverter material 1400. In certain embodiments, the diverter material 1400 can be degraded by hydrolysis, transesterification, oxidation, or by contacting with an enzyme under suitable temperature, pressure modification, and/or pH modification. For example, when the diverter material is prepared from a polyester polyol, the material can be degraded by hydrolysis or transesterification. In another example, when the diverter material 1400 is prepared from a polyether polyol is used for preparation, the material can be degraded under oxidative conditions. In some embodiments, the diverter material contains urethane linkages that can be degraded by hydrolysis.

An example of an elastic material that can be used in the diverter material 1400 is a polyurethane. In some embodiments, the polyurethane can be polyurethane beads. In some embodiments, the polyurethane beads can be porous. In some embodiments, the polyurethane beads can be nonporous. In some embodiments, the polyurethane beads can have a high elasticity. The chemical structure and characteristics of polyurethane are known to those skilled in the art. In some embodiments, the polyurethane can be polyurethane beads prepared from aromatic polyisocyanate. In some embodiments, the polyurethane can be polyurethane beads prepared from aliphatic polyisocyanate.

In some embodiments, a soft polymer that can be used in the diverter material 1400 is a polymer that contains monomers selected from an acrylate, an acrylamide, a N,N-dimethylacrylamide, a (meth)acrylamide, a N-alkyl(meth)acrylamide (where alkyl is $C_1$-$C_3$), a dimethyl(meth)acrylamide, a 4-acryloylmorpholine, a N-vinylpyrrolidone, a N-vinylformamide, a N-vinylacetamide, and an acrylic acid.

As used herein, a polymer is said to have a given monomer or functional group if the polymer was formed from a monomer having that functional group even though, due to the polymerization reaction, the polymer may not contain the exact structure of the monomer. For example, a polymer synthesized from acrylamide may be referred to as polyacrylamide and be said to contain an acrylamide group or groups even though, due to the polymerization reaction, the polymer does not include the acrylic acrylamide but rather an amide group.

In some embodiments, the soft polymer can be a natural polymer. In some embodiments, the soft polymer can be a synthetic polymer. In some embodiments, the soft polymer can be a hybrid of natural and synthetic polymer. In some embodiments, the natural polymer can be selected from the group consisting of a polysaccharide, a derivative of a polysaccharide, a guar, a cellulose, a hyaluronic acid, a gelatin, and an alginate. In some embodiments, the synthetic polymer can be selected from the group consisting of a poly(ethylene glycol), a poly(propylene glycol), a poly (lactic acid), a poly(glycolic acid), a poly(caprolactone), a poly(acrylic acid), a polyvinyl alcohol, a polyacrylate, a polyamide, a polyvinylpyrrolidone, and a silane modified polyether. In some embodiments, the soft polymer is a copolymer. In some embodiments, the soft polymer can be crosslinked. In some embodiments, the crosslinking is chemical. In some embodiments, the crosslinking is physical. In some embodiments, the soft polymer is a hydrogel.

Generally, the elasticity and softness of the diverter material 1400 may be tailored by the composition of the elastic material and the soft polymer.

In some embodiments, the diverter material 1400 can be compressed by a pressure (e.g., a pressure due to the injection of a fluid 1500) to be at least 10 (e.g. at least 20, at least 30, at least at least 50) volume to volume percent (v/v %) and at most 90 (e.g. at most 80, at most 70, at most 60, at most 50) v/v % percent relative to the original volume of the diverter material 1400.

In some embodiments, the diverter material 1400 can have an elasticity of at least $1\times10^2$ psi (e.g. at least $5\times10^2$ psi, at least $1\times10^3$ psi) and at most $1\times10^4$ psi (e.g. at most $7\times10^3$ psi, at most $5\times10^3$ psi) as measured according to single particle compression or packed multi-particle compression tests.

In some embodiments, the elastic material of the diverter material 1400 can have an elasticity of at least 10 psi (e.g. at least 50 psi, at least 90 psi) and at most 1000 psi (e.g. at most 900, at most 800) as measured according to single particle compression or packed multi-particle compression tests.

Generally, the soft polymer is viscoelastic. The rheological properties can be measured by a viscometer or a rheometer under steady shear and oscillatory mode. In some embodiments, the viscosity of the soft polymer material is in the range of at least 1,000 (e.g., at least 2,000, at least 3,000, at least 5,000) centipoise to at most 10,000 (e.g. at most 9,000, at most 8,000, at most centipoise.

In some embodiments, the ratio of the elastic portion to the soft polymer of the diverter material 1400 is at least 10/90 (e.g. 50/50, 70/30) and at most 99/1 (e.g. at most 98/2, at most 70/30) by weight.

Figure 2A:
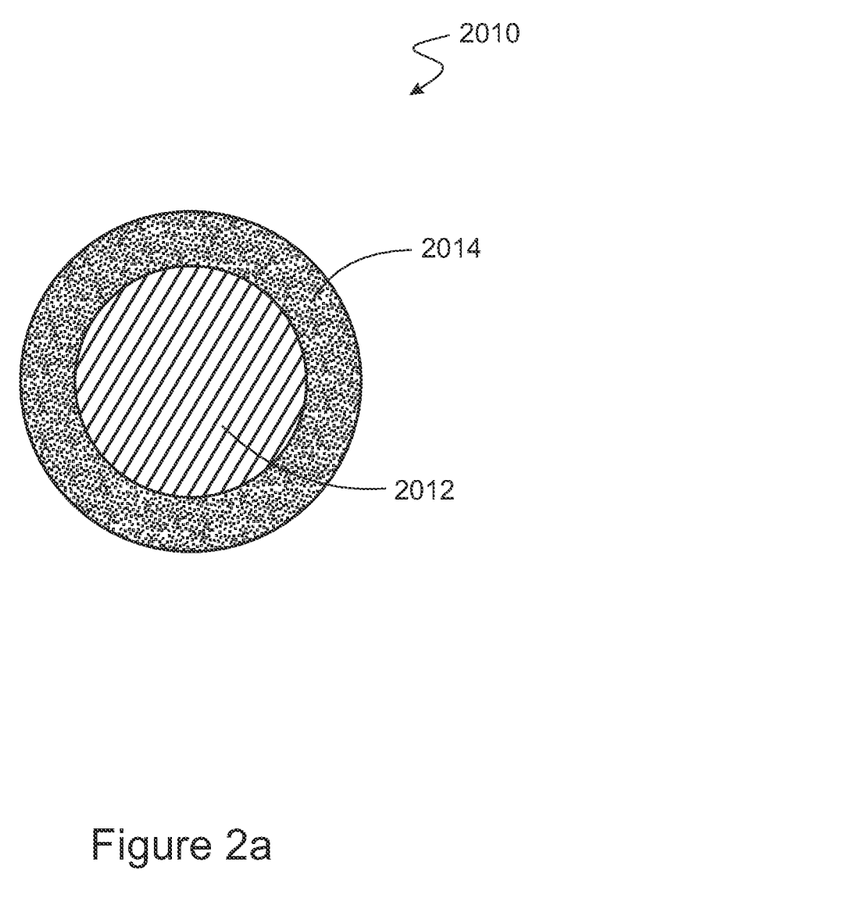
FIGS. 2a-2c schematically depict embodiments of diverter materials.
Figure 2B:
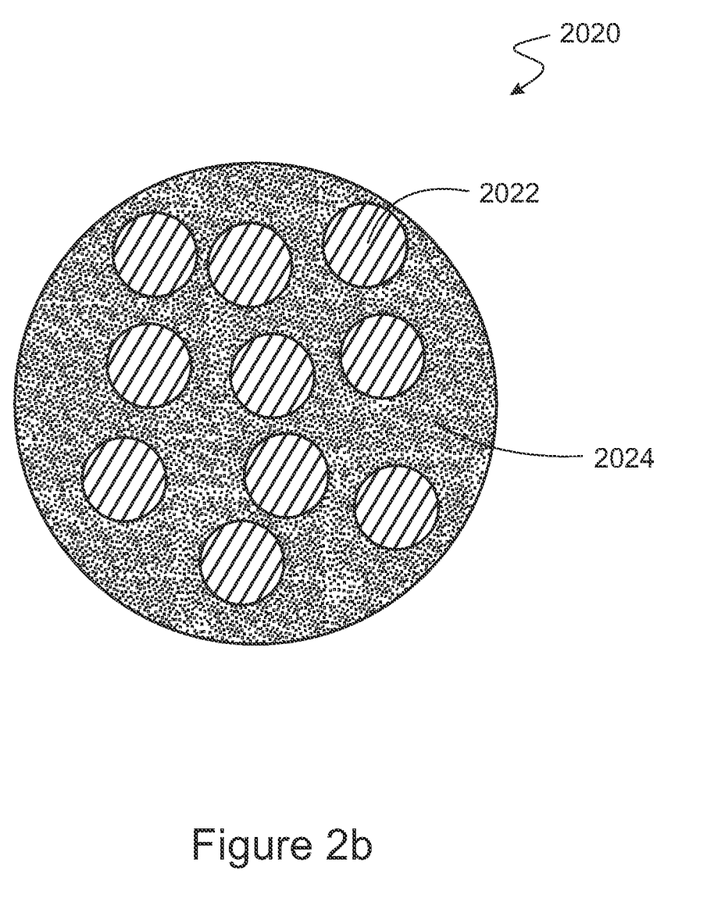
Figure 2C:
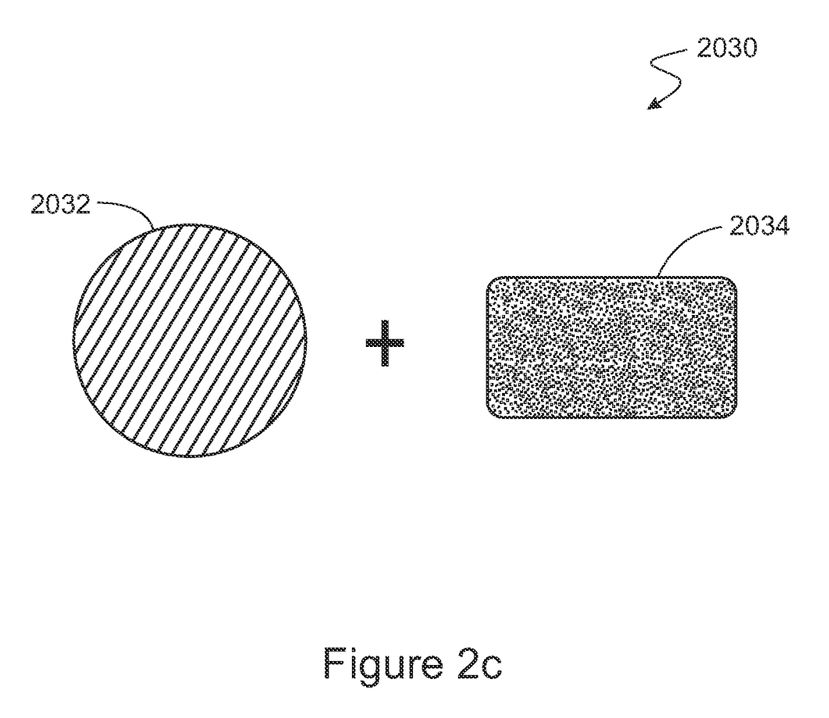

FIGS. 2a-2c schematically depict three different exemplary embodiments of the diverter material. In each embodiment, the diverter material includes an elastic material and a soft polymer.

In FIG. 2a, the diverter material is formed of particles 2010 containing a core 2012 formed of the elastic material (e.g., polyurethane) and a shell 2014 formed of the soft polymer.

In some embodiments, in the preparation of particles 2010, the core containing polyurethane, and the shell containing a soft polymer, the shell can be prepared followed by the introduction of a soft polymer shell. In some embodiments, a polyisocyanate component, a catalyst, a stabilizer and a hydrocarbon solvent can be charged to a reactor and mixed under agitation. Water can then be added to the reactor and the reaction can be allowed to continue at a desired temperature for a given time, causing polymer particles to form in the reaction media as the reaction continues. The polyurethane particles can then be obtained by filtration. Generally, the polyurethane particle size can be tailored. In some embodiments, the polyurethane particle size is at least 1 (e.g. at least 10, at least 30, at least 50, at least 100, at least 300, at least 500, at least 1000) micrometers (μm) to at most 3000 (e.g. at most 1000, at most 500, at most 300, at most 100, at most 50, at most 30, at most 10) μm.

The polyurethane core particles can serve as seeds for emulsion/dispersion/precipitation polymerization of another monomer to form a core-shell structure. In certain embodiments, the polyurethane core particles are dispersed in water in the presence of surfactant to form a stable dispersion. A monomer, such as an acrylate monomer, can then be mixed with water and surfactant to form an emulsion. The prepared emulsion containing monomer can then be mixed with the polyurethane particle dispersion, and the polyurethane particles will serve as seeds for the emulsion polymerization. Polymerization can be initiated through injection of a radical initiator to the system, and particles with a polyurethane core and acrylate polymer shell can be formed after polymerization of the acrylate monomer is completed. Particles with a different polymer shell can be obtained by adjusting the monomer composition.

In certain embodiments, a particle 2010 has a diameter of at least 50 micron (e.g. at least micron, at least 70 micron) and at most 5000 micron (e.g. at most 4000 micron, at most 3000 micron).

In FIG. 2b, the diverter material is formed of particles 2020 containing an elastic material (e.g., polyurethane) 2022 and a soft polymer 2024. The soft polymer 2024 is generally present at the outer perimeter of the particle 2020, and the elastic material is distributed within the soft polymer 2024.

In some embodiments of a particle 2020, the elastic material containing polyurethane, can be prepared using an oil-in-water emulsion. A polyisocyanate component, a hydrophobic monomer, a catalyst and desired additives can be dispersed in water in the presence of surfactant. A radical initiator can then be injected to initiate the polymerization of monomer in the formed emulsion. Curing of the polyisocyanate component by water and polymerization of hydrophobic monomer can occur simultaneously in the emulsion system. The particles form after the isocyanate resin curing and polymerization of monomers.

In some embodiments, a particle 2020 can be prepared using a dispersion. In certain embodiments, a dispersion can be prepared by dispersing the polyisocyanate component, a hydrophilic monomer and a catalyst in a hydrocarbon solvent with a surfactant. The polyisocyanate component and hydrophilic monomer may be incorporated into the dispersed droplets after mixing all components under agitation. An initiator can then be injected to the formed dispersion to initiate polymerization of the monomer. Water can be added to crosslink the polyisocyanate component. Curing of the polyisocyanate component and polymerization of the hydrophilic monomer can occur simultaneously inside the dispersed droplets. The particles form after curing of the polyisocyanate and polymerization of hydrophilic monomers.

In some embodiments, a particle 2020 can be prepared using droplets. In some embodiments, a polyisocyanate component and a soft polymer may be charged to a reactor and mixed under agitation, then a catalyst, a stabilizer/surfactant and a hydrocarbon solvent are added to a reactor and mixing is continued. Water may then be added to the reactor. Since the polyisocyanate component and soft polymer are immiscible with hydrocarbon solvent, small droplets with polyisocyanate component and soft polymer incorporated inside can form through agitation. The small droplets become discrete particles after curing the polyisocyanate components by water, and particles can be obtained with both soft polymers and cured polyurethane trapped inside the particles. The size of particles can be controlled by the agitation energy and time, surfactant level, and also the concentration of polyisocyanate component and soft polymer in the immiscible liquid.

In some embodiments, a particle 2020 has a diameter of at least 50 micron (e.g. at least micron, at least 70 micron) and at most 5000 micron (e.g. at most 4000 micron, at most 3000 micron).

In FIG. 2c, the diverter material is formed of a blend 2030 of an elastic material (e.g., polyurethane) 2032 and a soft polymer 2034.

In certain embodiments, the blend 2030 can be a simple blend of elastic polyurethane particles and soft polymers. In certain embodiments, the polyurethane particles can be synthesized in hydrocarbon solvent as discussed above. In certain embodiments, the polyurethane can be synthesized from a polyisocyanate component. In certain embodiments, the soft polymer can be synthesized from a monomer. In certain embodiments, the soft polymer can be natural polymers and/or synthetic polymers. In certain embodiments, a polymer of the blend 2030 can be synthesized using an initiator. In certain embodiments, a polymer of the blend 2030 can be synthesized using a catalyst. In certain embodiments, a polymer of the blend 2030 can be synthesized using a surfactant. In certain embodiments, a polymer of the blend 2030 can be obtained commercially.

In certain embodiments of the particle 2010, the particle 2020 and/or the blend 2030, the polyisocyanate component can be an isocyanate-terminated polyurethane prepolymer. In certain embodiments, the isocyanate-terminated polyurethane prepolymer is prepared through the reaction of an isocyanate monomer with a polyol component. In certain embodiments, the isocyanate monomer can be selected from the group consisting of isophorone diisocyanate (IPDI), hexamethylene diisocyanate (HDI), toluene diisocyanate (TDI), methylene diphenyl diisocyanate (MDI), and polymeric diphenylmethane diisocyanate (PMDI). In certain embodiments, the polyol-containing component may be a polymeric alcohol. In certain embodiments, the polyol-containing components can be selected from the group consisting of polyester polyols, polyether polyols, and polycarbonate polyols. In certain embodiments, the polyol-containing component can be a mixture of polyols. In certain embodiments, the hydroxyl number of the polyol component is at least 14 (e.g. at least 20, at least 50, at least 100, at least 200, at least 500, at least 1000) and at most 2000 (e.g. at most 1500, at most 1000, at most 500). In certain embodiments, the isocyanate group content in the isocyanate-terminated polyurethane prepolymer can be at least 1 (e.g. at least 2, at least 3, at least, 4, at least 5) percent by weight (wt. %) and at most 8 (e.g. at most 7, at most 6, at most 5) wt. %.

In some embodiments of the particle 2010, the particle 2020 and/or the blend 2030, the monomer can be selected from the group consisting of an acrylate, an acrylamide, a N,N-dimethylacrylamide, a (meth)acrylamide, a N-alkyl (meth)acrylamide (where alkyl is $C_1$-$C_3$), a dimethyl(meth) acrylamide, a 4-acryloylmorpholine, a N-vinylpyrrolidone, a N-vinylformamide, a N-vinylacetamide, and an acrylic acid.

In some embodiments of the particle 2010, the particle 2020 and/or the blend 2030, the initiator is a water-soluble radical initiator. In some embodiments, the initiator is an oil-soluble radical initiator. In some embodiments, the initiator is selected from the group consisting of a peroxide-based initiator (e.g. tert-butyl peroxide, benzoyl peroxide), an azo compound-based initiator (e.g. azobisisobutyronitrile, azobisdimethylvaleronitrile), and a persulfate-based initiator (e.g. potassium persulfate).

Generally, the catalyst of the particle 2010, the particle 2020 and/or the blend 2030 can be any catalyst known to accelerate the isocyanate reaction with water. In certain embodiments, the catalyst can be a quadrivalent tin compound (e.g. dibutyltin diacetylacetonate, dibutyltin dilaurate, dioctyltin diacetylacetonate, dioctyltin acetoacetate). In certain embodiments, the catalyst can be an amine-based catalyst. In certain embodiments, a single catalyst may be used. In certain embodiments, two or more catalysts may be used in combination.

In some embodiments, the hydrocarbon solvent of the particle 2010, the particle 2020 and/or the blend 2030 is selected from the group containing oils (e.g. crude oil, base oil), aliphatic hydrocarbons, aromatic hydrocarbons, and petroleum distillate fractions (e.g. mineral oil, kerosene, naphtha, diesel).

In certain embodiments, the surfactant of the particle 2010, the particle 2020 and/or the blend 2030 can be anionic. In certain embodiments, the surfactant can be cationic. In certain embodiments, the surfactant can be non-ionic. In certain embodiments, the surfactants can be selected from the group consisting of a polyglycerol ricinoleate, an ethylene oxide-propylene oxide block copolymer, a fatty acid ethoxylate, an alkyl phenol ethoxylate, a sorbitan ester ethoxylate, an alcohol sulfate, an alcohol ethoxy sulfate, an alkylbenzene sulfonate, and a betaine surfactant.

Figure 3A:
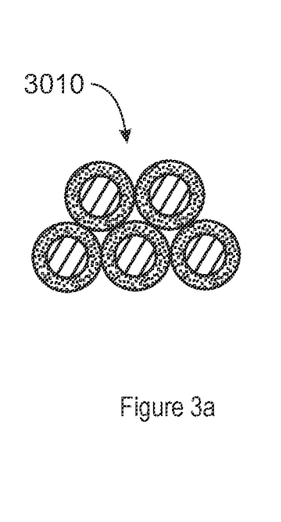
FIG. 3a schematically depicts an embodiment of the diverter material.
Figure 3B:
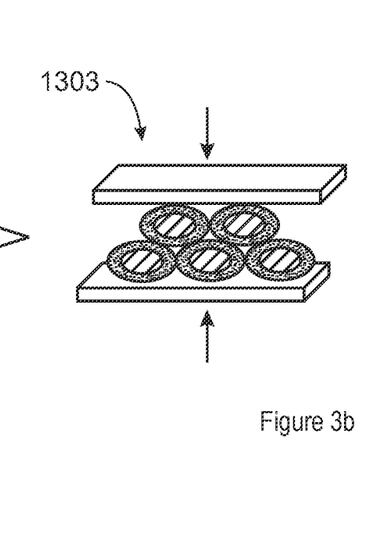
FIGS. 3b and 3c schematically depict an embodiment of the diverter material in an opening in a high permeability zone.
Figure 3C:
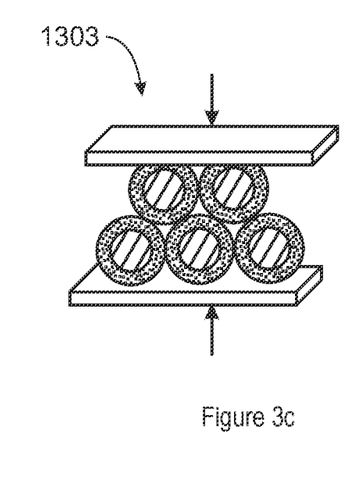

FIG. 3a schematically depicts a diverter material 3010 formed of a plurality of particles 2010 (FIG. 2a). FIG. 3b schematically depicts the diverter material 3010 disposed in an opening 1303 of a high permeability zone. The diverter material 3010 is compressible so that it can block the opening 1303 (e.g., by forming a particulate pack within the opening 1303). FIG. 3c schematically depicts the diverter material 3010 disposed in the opening 1303 after the opening 1303 has expanded (e.g., due to matrix treatment). The diverter material 3010 is reversibly compressible such that it can expand when the opening 1303 expands. As a result, even after the opening 1303 expands, the diverter material 3010 can continue to block the opening 1303.

Figure 4A:
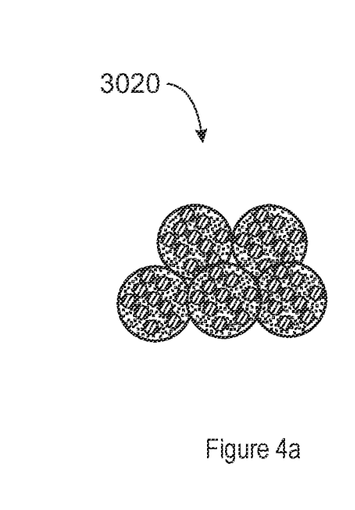
FIG. 4a schematically depicts an embodiment of the diverter material.
Figure 4B:
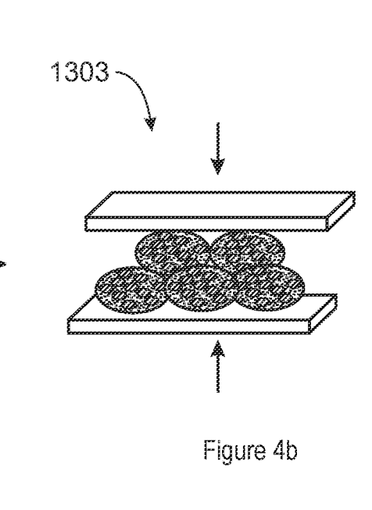
FIGS. 4b and 4c schematically depict an embodiment of the diverter material in an opening in a high permeability zone.
Figure 4C:
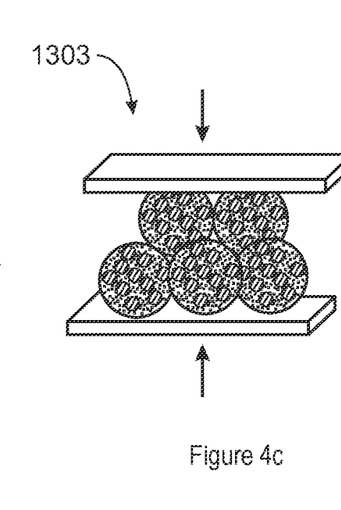

FIGS. 4a-4c correspond to FIGS. 3a-3c, respectively, except that a diverter material 3020 is used. The diverter material 3020 is formed of a plurality of particles 2020 (FIG. 2b).

Figure 5A:
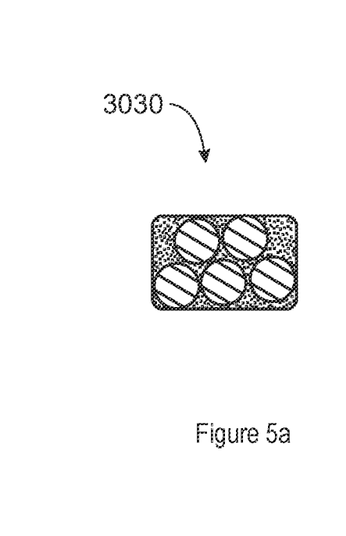
FIG. 5a schematically depicts an embodiment of the diverter material.
Figure 5B:
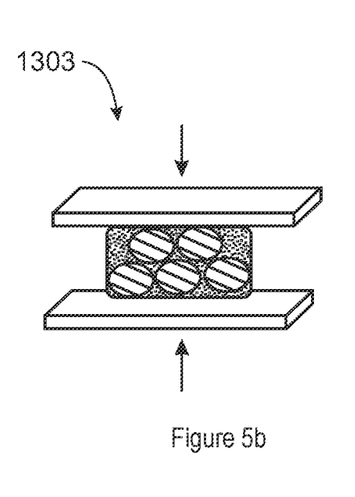
FIGS. 5b and 5c schematically depict an embodiment of the diverter material in an opening in a high permeability zone.
Figure 5C:
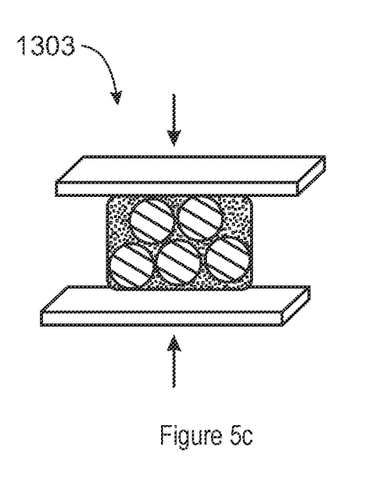

FIGS. 5a-5c correspond to FIGS. 3a-3c, respectively, except that a diverter material 3030 is used. The diverter material is formed of a blend 2030 (FIG. 2c).

EXAMPLES

Example—1

6.5 g of Desmodur® E14 (aromatic polyisocyanate prepolymer based on toluene diisocyanate, Covestro) and 6 g of SAX350 (silyl terminated polyether, Kaneka) were charged to a reactor and mixed under overhead agitation at 500 rpm for 1 min. 0.1 g of Einar® 101 (polyglycerol ricinoleate stabilizer, Palsgaard), 0.2 g of Reaxis C226 (dibutyltin based catalyst, Reaxis) and 100 g of light mineral oil (VWR) were mixed in a beaker then added to the reactor. The reactor was placed in a water bath with temperature set at 50° C. The components were mixed under overhead agitation at 500 rpm for 2 min. 2 g of water was added to the reactor. The reaction was allowed to continue at 50° C. for 5 h under agitation. The final product was filtered, washed with methanol and dried overnight in fume hood to yield particles containing an aromatic polyurethane and polyether, the aromatic polyurethane being distributed within the polyether.

Example—2

22 g of Desmodur® E14 (aromatic polyisocyanate prepolymer based on toluene diisocyanate, Covestro) and 3 g of SAX350 (silyl terminated polyether, Kaneka) were charged to a reactor and mixed under overhead agitation at 500 rpm for 1 min. 0.12 g of Einar® 101 (polyglycerol ricinoleate stabilizer, Palsgaard), 0.2 g of Reaxis C226 (dibutyltin based catalyst, Reaxis) and 100 g of light mineral oil (VWR) were mixed in a beaker then added to the reactor. The reactor was placed in a water bath with temperature set at 50° C. The components were mixed under overhead agitation at 500 rpm for 2 min. 2 g of water was added to the reactor. The reaction was allowed to continue at 50° C. for 5 h under agitation. The final product was filtered, washed with methanol and dried overnight in fume hood to yield particles containing an aromatic polyurethane and polyether, the aromatic polyurethane being distributed within the polyether.

What is claimed:

1. A method, comprising:
   using a diverter material to block at least a portion of a high permeability zone in an underground formation,
   wherein the diverter material comprises a polyurethane and a second polymer; and
   wherein the diverter material comprises at least one member selected from the group consisting of:
   particles comprising a core and a shell, the core comprising the polyurethane, and the shell comprising the second polymer;
   particles comprising the polyurethane and the second polymer, the polyurethane being distributed within the second polymer; and
   a blend comprising the polyurethane and the second polymer.

2. The method of claim 1, wherein the polyurethane comprises an elasticity of at least 100 psi and at most 1,000 psi as measured by single particle compression or packed multi-particle compression tests.

3. The method of claim 1, wherein the second polymer comprises a viscosity of at least 1,000 centipoise and at most 10,000 centipoise.

4. The method of claim 1, further comprising disposing the diverter material in the high permeability zone of the underground formation.

5. The method of claim 4, wherein disposing the diverter material in the high permeability zone of the underground formation compresses the diverter material.

6. The method of claim 5, wherein the diverter material is reversibly compressible.

7. The method of claim 4, wherein disposing the diverter material in the high permeability zone of the underground formation reduces a volume of the diverter material from 10% to 90%.

8. The method of claim 1, wherein the second polymer fills gaps between the polyurethane.

9. The method of claim 1, further comprising degrading the diverter material by at least one process selected from the group consisting of hydrolysis, transesterification, oxidation, interaction with an enzyme, pressure modification, and pH modification.

10. The method of claim 1, wherein the second polymer comprises at least one member selected from the group consisting of an acrylate, an acrylamide, a N,N-dimethylacrylamide, a (meth)acrylamide, a N-alkyl(meth)acrylamide (where alkyl is C1-C3), a dimethyl(meth)acrylamide, a 4-acryloylmorpholine, a N-vinylpyrrolidone, a N-vinylformamide, a N-vinylacetamide, and an acrylic acid.

11. The method of claim 1, wherein the second polymer comprises at least one member selected from the group consisting of a polysaccharide, a derivative of a polysaccharide, a guar, a cellulose, a hyaluronic acid, a gelatin alginate, a poly(ethylene glycol), a poly(propylene glycol), a poly(lactic acid), a poly(glycolic acid), a poly(caprolactone), a poly(acrylic acid), a polyvinyl alcohol, a polyacrylate, a polyamide, a polyvinylpyrrolidone, and a silane modified polyether.

12. The method of claim 1, wherein the diverter material has a weight ratio of the polyurethane to the second polymer of from 1:9 to 99:1.

13. The method of claim 1, wherein:
the high permeability zone comprises a member selected from the group consisting of a fracture of the underground formation, a macroscopic channel of the underground formation, and a high permeability layer of the underground formation;
the diverter material is in the member; and
the diverter material at least partially blocks the member.

14. The method of claim 13, wherein a volume of the member increases, and, after the volume of the member increases, the diverter material still at least partially blocks the member.

15. The method of claim 1, wherein the diverter material is in the form of an agglomerated particulate pack.

16. The method of claim 1, further comprising using the diverter material to divert a flow of a liquid within the underground formation, wherein the liquid comprises at least one member selected from the group consisting of a fracturing fluid and an acid.

17. The method of claim 1, wherein:
the underground formation further comprises a low permeability zone;
the method comprises disposing the diverter material in the high permeability zone; and
the diverter material increases an amount of a fracturing fluid or an acid in the low permeability zone compared to when the diverter material is not present in the high permeability zone.

18. The method of claim 17, wherein:
the high permeability zone comprises a member selected from the group consisting of a fracture of the underground formation, a macroscopic channel of the underground formation, and a high permeability layer of the underground formation;
the diverter material is in the member; and
the diverter material at least partially blocks the member.

19. A system, comprising:
a diverter material; and
a fluid,
wherein:
the diverter material is disposed in a high permeability zone of an underground formation so that the diverter material blocks at least a portion of the high permeability zone;
the diverter material comprises a polyurethane and a second polymer; and
the diverter material comprises at least one member selected from the group consisting of:
particles comprising a core and a shell, the core comprising the polyurethane, and the shell comprising the second polymer;
particles comprising the polyurethane and the second polymer, the polyurethane being distributed within the second polymer; and
a blend comprising the polyurethane and the second polymer.

* * * * *